United States Patent
Ishihara (10) Patent No.: US 11,758,623 B2
(45) Date of Patent: Sep. 12, 2023

(54) DETECTOR FOR CHROMATOGRAPH

(71) Applicant: SHIMADZU CORPORATION, Kyoto (JP)

(72) Inventor: Yugo Ishihara, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 17/605,018

(22) PCT Filed: Apr. 26, 2019

(86) PCT No.: PCT/JP2019/018012
§ 371 (c)(1),
(2) Date: Mar. 11, 2022

(87) PCT Pub. No.: WO2020/217475
PCT Pub. Date: Oct. 29, 2020

(65) Prior Publication Data
US 2022/0210879 A1   Jun. 30, 2022

(51) Int. Cl.
*H05B 41/14*    (2006.01)
*H05B 41/282*   (2006.01)
*G01N 30/30*    (2006.01)
*G01N 30/32*    (2006.01)
*G01N 30/74*    (2006.01)
*G01N 30/02*    (2006.01)

(52) U.S. Cl.
CPC .......... *H05B 41/282* (2013.01); *G01N 30/30* (2013.01); *G01N 30/32* (2013.01); *G01N 30/74* (2013.01);
(Continued)

(58) Field of Classification Search
CPC ........ H05B 41/14; H05B 41/30; H05B 41/34; H05B 41/36; H05B 41/282; H05B 41/295; G01N 30/32; G01N 30/74; G01N 30/8665
See application file for complete search history.

(56) References Cited

U.S. PATENT DOCUMENTS

| 4,742,276 A | * | 5/1988 | Ku | .......... H05B 41/34 315/106 |
| 5,150,009 A | * | 9/1992 | Kling | ...... H05B 41/16 315/105 |

(Continued)

FOREIGN PATENT DOCUMENTS

| JP | 05-093752 A | 4/1993 |
| JP | 09-210780 A | 8/1997 |

(Continued)

OTHER PUBLICATIONS

International Search Report for corresponding Application No. PCT/JP2019/018012, dated Jul. 16, 2019.

(Continued)

*Primary Examiner* — Tung X Le (74) *Attorney, Agent, or Firm* — Renner, Otto, Boisselle & Sklar, LLP (57) ABSTRACT

A detector for a chromatograph includes a light source, and a light detector that detects light generated based on turning on of the light source, wherein the light source includes a deuterium lamp, and a deuterium lamp power supply circuit connected to the deuterium lamp, and the deuterium lamp power supply circuit includes a DC voltage generation circuit that generates a DC voltage by performing a switching operation, a rectifying operation and a smoothing operation, a voltage application circuit that applies a DC voltage generated by the DC voltage generation circuit to the deuterium lamp, a first feedback circuit that feeds a first feedback voltage changing depending on a DC voltage to the DC voltage generation circuit such that the DC voltage generated by the DC voltage generation circuit becomes close to a discharge maintaining voltage, after electric discharge of the deuterium lamp is started, and a constant current control circuit that controls a discharge current of the deuterium lamp to be constant.

9 Claims, 5 Drawing Sheets

(52) U.S. Cl.
CPC ............... *G01N 2030/027* (2013.01); *G01N 2030/3084* (2013.01); *G01N 2030/326* (2013.01)

(56) References Cited

U.S. PATENT DOCUMENTS

| | | | | |
|---|---|---|---|---|
| 5,629,588 | A | * | 5/1997 | Oda ................... H05B 41/2921 315/307 |
| 5,939,840 | A | * | 8/1999 | Nakagawa ......... H05B 41/3921 315/276 |
| 2013/0049639 | A1 | * | 2/2013 | Bungo ................... H05B 41/36 315/307 |
| 2014/0117870 | A1 | | 5/2014 | Ishihara |
| 2019/0254151 | A1 | * | 8/2019 | Winderlich ............ H05B 41/39 |

FOREIGN PATENT DOCUMENTS

| | | |
|---|---|---|
| JP | 2009-158344 A | 7/2009 |
| JP | 5117180 B2 | 1/2013 |
| JP | 2013-048030 A | 3/2013 |
| JP | 2014-085315 A | 5/2014 |

OTHER PUBLICATIONS

Written Opinion for corresponding Application No. PCT/JP2019/018012, dated Jul. 16, 2019 (English machine translation).

\* cited by examiner

DETECTOR FOR CHROMATOGRAPH

TECHNICAL FIELD

The present invention relates to a detector for a chromatograph.

BACKGROUND ART

In a liquid chromatograph, a spectrophotometer (absorbance detector) is used to detect sample components separated in an analysis column. A deuterium lamp is used as a light source of ultraviolet light in the spectrophotometer. Further, a power supply circuit for a deuterium lamp is used to turn on the deuterium lamp (see Patent Documents 1 and 2.)
[Patent Document 1] JP 2014-85315 A
[Patent Document 2] JP 5117180 B

SUMMARY OF INVENTION

Technical Problem

A high voltage is applied to turn on the deuterium lamp. This causes breakdown in the deuterium lamp, and the deuterium lamp is turned on. Thereafter, a constant current is supplied to the deuterium lamp, so that the deuterium lamp is kept on. After turning on of the deuterium lamp, the discharge maintaining voltage between an anode electrode and a cathode electrode of the deuterium lamp is lower than the voltage before turning on of the deuterium lamp. Therefore, in a case in which the voltage applied to the deuterium lamp after turning on of the deuterium lamp is equal to the voltage applied to the deuterium lamp before turning on of the deuterium lamp, a power loss in the circuit occurs due to the difference between the application voltage and the discharge maintaining voltage.

In a power supply device for a deuterium discharge tube described in Patent Document 2, a current output from a power converter made of a DC chopper flows into a primary coil of a transformer. A smoother DC voltage is obtained from a voltage of a secondary coil of the transformer by a triple voltage rectifier circuit and an LC filter circuit. A DC voltage is applied to the deuterium discharge tube.

After the deuterium discharge tube is turned on, a discharge current of the deuterium discharge tube is detected as a negative feedback value by a current detection circuit. The negative feedback value is compared to a set value, and pulse control is performed on the current converter by a control circuit such that the negative feedback value becomes equal to the set value.

However, in the power supply device for a deuterium discharge tube of the Patent Document 2, because a discharge current is controlled by switching control of the transformer, switching noise and ripple of the transformer are superimposed on the discharge current. Further, the discharge current is changed due to the temperature characteristics of a large number of devices that constitute the power converter, the transformer, the triple voltage rectifier circuit, the LC filter circuit, the control circuit, etc. When the discharge current is changed, the light amount of the deuterium lamp is changed, and the detection accuracy of the spectrophotometer is degraded. It is necessary to reduce the cutoff frequency of the filter circuit or improve the speed of a feedback loop of the entire circuit in order to reduce switching noise and ripple. However, it is difficult to realize both because of their trade-off relationship. Further, it is necessary to use a large number of costly devices having good temperature characteristics in order to improve the temperature characteristics of the circuit constituted by the large number of devices. This increases the component cost. Therefore, it is difficult to control a discharge current to be constant at high accuracy while suppressing the cost. In a case in which the light amount of the deuterium lamp is not maintained constant with high accuracy, it is difficult to improve detection accuracy of the spectrophotometer.

An object of the present invention is to provide a detector for a chromatograph that enables suppression of an increase in cost and improvement of detection accuracy.

Solution to Problem

A detector for a chromatograph includes a light source, and a light detector that detects light generated based on turning on of the light source, wherein the light source includes a deuterium lamp, and a deuterium lamp power supply circuit connected to the deuterium lamp, and the deuterium lamp power supply circuit includes a DC voltage generation circuit that generates a DC voltage by performing a switching operation, a rectifying operation and a smoothing operation, a voltage application circuit that applies a DC voltage generated by the DC voltage generation circuit to the deuterium lamp, a first feedback circuit that feeds a first feedback voltage changing depending on a DC voltage to the DC voltage generation circuit such that the DC voltage generated by the DC voltage generation circuit becomes close to a discharge maintaining voltage, after electric discharge of the deuterium lamp is started, and a constant current control circuit that controls a discharge current of the deuterium lamp to be constant.

Advantageous Effects of Invention

The present invention enables suppression of an increase in cost and improvement of detection accuracy of a detector for a chromatograph.

DESCRIPTION OF EMBODIMENTS

A detector for a chromatograph, according to embodiments will be described below in detail with reference to the drawings.

(1) Configuration of Light Source

Figure 1:
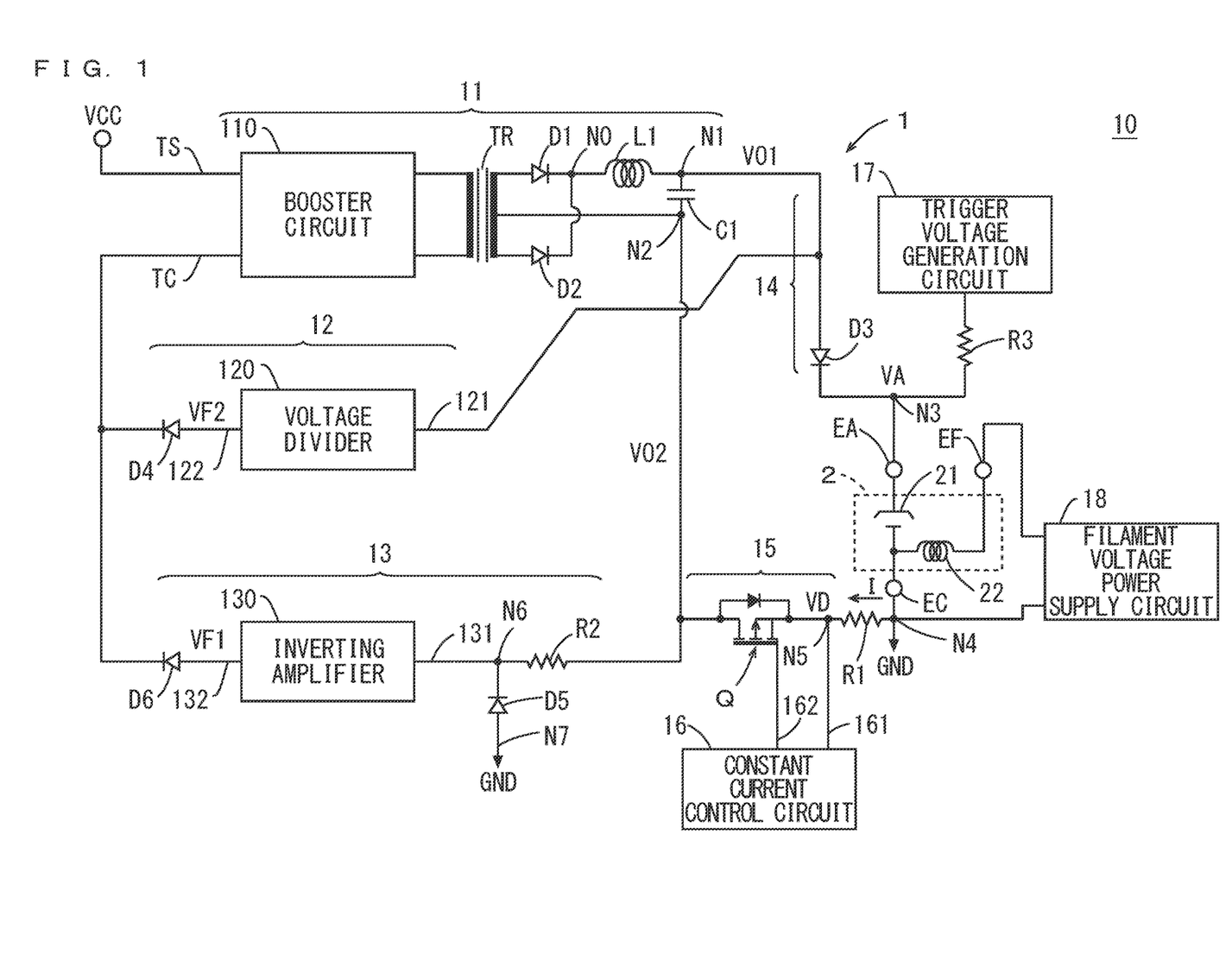
FIG. 1 is a circuit diagram showing the configuration of a liquid source in a detector for a chromatograph according to one embodiment.

FIG. 1 is a circuit diagram showing the configuration of a light source in the detector for a chromatograph according to one embodiment.

The light source 10 of FIG. 1 is constituted by a deuterium lamp power supply circuit 1 and a deuterium lamp 2. The deuterium lamp power supply circuit 1 includes a DC voltage generation circuit 11, feedback circuits 12, 13, current paths 14, 15, a constant current control circuit 16, a trigger voltage generation circuit 17 and a filament voltage power supply circuit 18.

The DC voltage generation circuit 11 includes a booster circuit 110, a transformer TR, diodes D1, D2, an inductor L1 and a capacitor C1 The booster circuit 110 is constituted by a DC (Direct Current) boost chopper, for example. The booster circuit 110 includes a power supply terminal TS and a control terminal TC, A power supply voltage VCC is supplied to the power supply terminal TS. Feedback voltages VF1, VF2, described below, are selectively supplied to the control terminal TC. The booster circuit 110 boosts the power supply voltage VCC by performing a switching operation based on the feedback voltages VF1, VF2 and generates a DC voltage between nodes N1, N2.

An output terminal of the booster circuit 110 is connected to a primary winding of the transformer TR. One end of a secondary winding of the transformer TR is connected to a node N0 through the diode D1, and the other end of the secondary winding of the transformer TR is connected to the node N0 through the diode D2. An intermediate terminal of the secondary winding of the transformer TR is connected to the node N2. The inductor L1 is connected between the node N0 and the node N1. The capacitor C1 is connected between the node N1 and the node N2. The diodes D1, D2 performs a rectifying operation. The inductor L1 and the capacitor C1 performs a smoothing operation. An output voltage VO1 is output to the node N1, and an output voltage VO2 is output to the node N2.

The current path 14 includes a diode D3. An anode of the diode D3 is connected to the node N1, and a cathode of the diode D3 is connected to a node N3. The node N3 is connected to an anode electrode EA of the deuterium lamp 2, The deuterium lamp 2 includes a discharge tube 21 and a filament 22. A voltage of the node N3 is referred to as an anode voltage VA.

A current path 15 includes a detection resistor R1 and a p-channel MOSFET (Metal-Oxide Field-Effect Transistor; hereinafter referred to as a transistor) Q. The detection resistor R1 is connected between a node N4 and a node N5. The node N4 is connected to a cathode electrode EC of the deuterium lamp 2. The node N4 is held at a ground potential GND. The node N4 may be held at a reference potential different from the around potential GND. The source of the transistor Q is connected to the node N5, and the drain of the transistor Q is connected to the node N2. A current I of the deuterium lamp 2 flows through the current paths 14, 15.

An input terminal 161 of the constant current control circuit 16 is connected to the node N5, and an output terminal 162 of the constant current control circuit 16 is connected to a gate electrode of the transistor Q. The constant current control circuit 16 controls a gate voltage of the transistor Q such that a current flowing through the detection resistor R1 is constant, as described below. A voltage of the node N5 is referred to as a detection voltage VD.

The feedback circuit 12 includes a voltage divider 120 and a diode D4. An input terminal 121 of the voltage divider 120 is connected to the node N1, and an output terminal 122 of the voltage divider 120 is connected to the control terminal TC of the booster circuit 110 through the diode D4. The voltage divider 20 divides the voltage of the node N1 using a plurality of resistors, for example, and outputs a voltage lower than the output voltage VO1 to the output terminal 122 as the feedback voltage VF2.

The feedback circuit 13 includes a resistor R2, diodes D5, D6 and an inverting amplifier 130. The resistor R2 is connected between the node N2 and a node N6. The diode D6 is connected between the node N6 and a node N7. The node N7 is held at a ground potential GND. The node N7 may be held at a reference potential different from the ground potential GND.

An input terminal 131 of the inverting amplifier 130 is connected to the node N6, and an output terminal 132 of the inverting amplifier 130 is connected to the control terminal TC of the booster circuit 110 through the diode D6, The inverting amplifier 130 inverts the polarity of a voltage of the input terminal 131, and amplifies or divides the voltage of the input terminal 131, and then outputs an inverted voltage, and an amplified or divided voltage to the output terminal 132 as the feedback voltage VF1. As described below, a large negative voltage is temporarily generated in the node N2 immediately after electric discharge of the deuterium lamp 2 is started. The resistor R2 and the diode D5 are provided to protect the inverting amplifier 130 from this negative voltage.

The diodes D4, D6 constitute a selection circuit for selectively outputting the feedback voltage VF2 output from the voltage divider 120 and the feedback voltage VF1 output from the inverting amplifier 130 to the control terminal TC of the booster circuit 110.

An output terminal of the trigger voltage generation circuit 17 is connected to the node N3 through a resistor R3. The trigger voltage generation circuit 17 generates a trigger voltage for turning on the deuterium lamp 2.

One output terminal of the filament voltage power supply circuit 18 is connected to a filament terminal EF of the deuterium lamp 2, and the other output terminal of the filament voltage power supply circuit 18 is connected to the node N4. The filament 22 is connected between the cathode electrode EC and the filament terminal EF. The filament voltage power supply circuit 18 applies a predetermined filament voltage to the filament 22.

Figure 2:
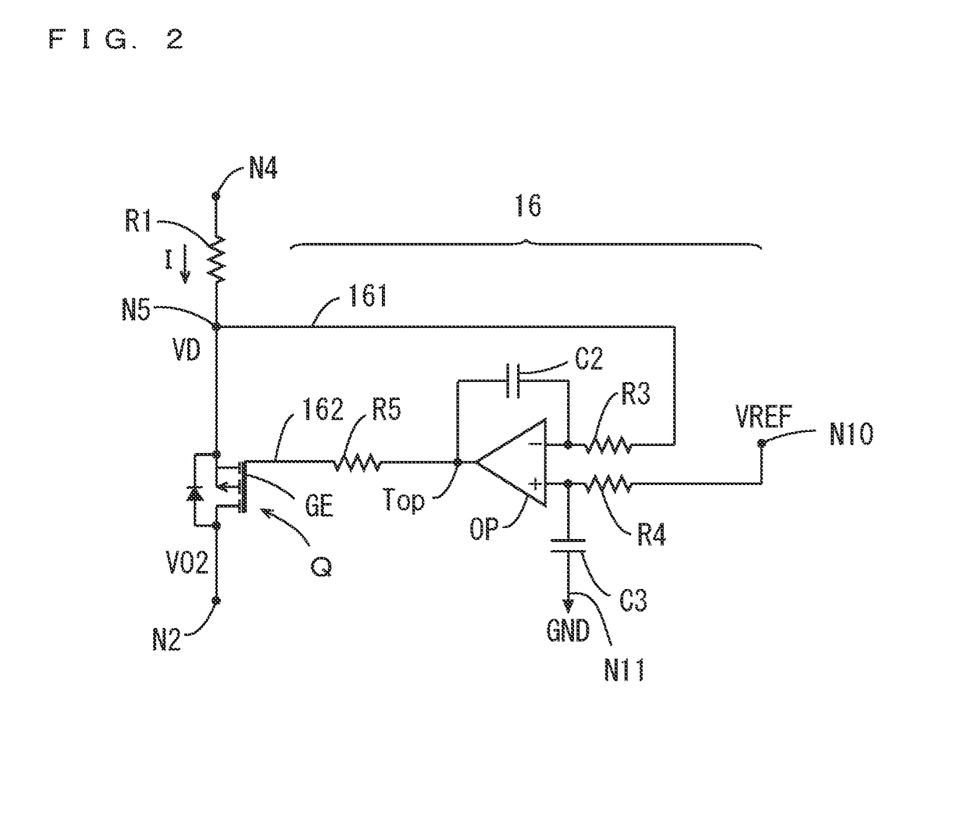
FIG. 2 is a circuit diagram showing one example of the configuration of a constant current control circuit.

FIG. 2 is a circuit diagram showing one example of the configuration of the constant current control circuit 16. As shown in FIG. 2, the constant current control circuit 16 includes an operational amplifier OP, resistors R3 to R5 and capacitors C2, C3. An inverting input terminal of the operational amplifier OP is connected to the node N5 through the resistor R3 and is connected to an output terminal Top through the capacitor C2. One end of the resistor R3 connected to the node N5 is the input terminal 161. A non-inverting input terminal of the operational amplifier OP is connected to a node N10 through the resistor R4 and is connected to a node N11 through the capacitor C3. A constant reference potential VREF is supplied to the node NW. The node N11 is held at the ground potential GND, The output terminal Top of the operational amplifier OP is connected to a gate electrode GE of the transistor Q through the resistor R5. One end of the resistor R5 connected to the gate electrode GE of the transistor Q is the output terminal 162. The reference potential VREF is generated by a circuit having good temperature characteristics.

As shown in FIG. 1, the node N4 is held at the ground potential GND, The operational amplifier OP controls the transistor Q such that the detection voltage VD of the node N5 is equal to the reference potential VREF. Therefore, letting a resistor value of the detection resistor R1 be $R_1$, the current I flowing through the detection resistor R1 and the transistor Q is $VREF/R_1$.

(2) Operation of Deuterium Lamp Power Supply Circuit 1

Figure 3:
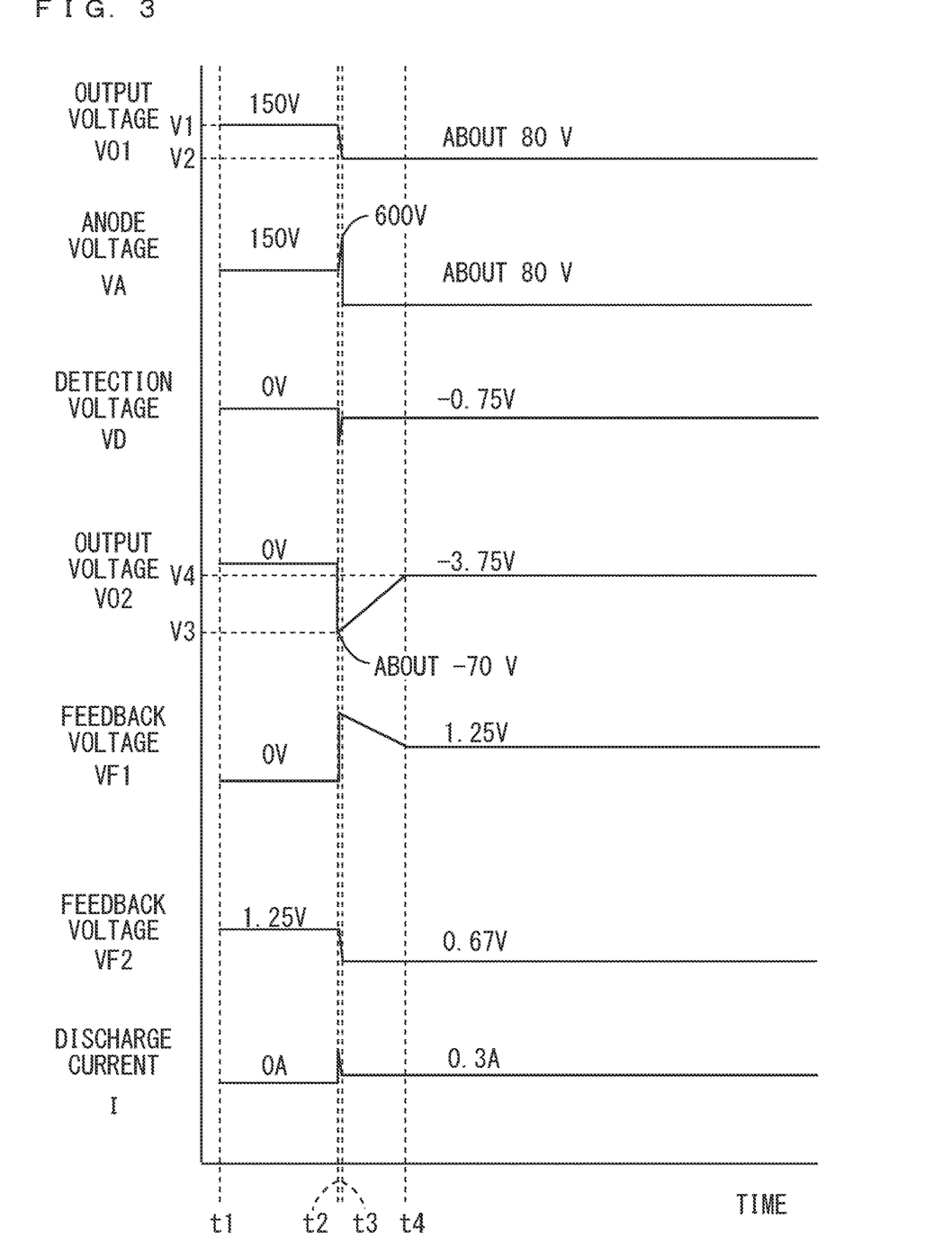
FIG. 3 is a waveform diagram of a voltage and a current showing an operation of a deuterium lamp power supply circuit of FIG. 1.

FIG. 3 is a waveform diagram in regard to voltages and a current showing an operation of the deuterium lamp power supply circuit 1 of FIG. 1. FIG. 3 shows waveforms showing changes of the output voltage VO1, the anode voltage VA, the detection voltage VD, the output voltage VO2, the feedback voltages VF1, VF2 and the current I. The abscissa of FIG. 3 indicates the time.

At points t1 to T2 in time of FIG. 3, the deuterium lamp 2 is not discharging electricity. Before electric discharge of the deuterium lamp 2, the DC voltage generation circuit 11 generates a DC voltage (150 V, for example) required for preheating the deuterium lamp 2. In this case, a value of the output voltage VO1 is V1 (150 V, for example), and a value of the output voltage VO2 is V2 (0 V, for example). Thus, the anode voltage VA is about 150 V, for example. At this time, because the deuterium lamp 2 is not discharging electricity, the current I flowing through the detection resistor R1 is substantially 0 A. Therefore, the detection voltage VD of the node N5 is 0 V.

The voltage divider 120 of the feedback circuit 12 divides the output voltage VO1 using a plurality of resistors, thereby outputting the feedback voltage VF2 of 1.25 V, for example. At this time, the feedback voltage VF1 output from the inverting amplifier 130 of the feedback circuit 13 is substantially 0 V. The feedback voltage VF2, which is the higher voltage between the feedback voltages VF1, VF2, is selectively input to the control terminal TV of the booster circuit 110. Therefore, the booster circuit 110 performs a switching operation such that the output voltage VO1 maintains a value V1 (150 V, for example) based on the feedback voltage VF2.

At the point t2 in time, the trigger voltage generation circuit 17 generates a pulse-shaped trigger voltage. A peak of the trigger voltage is 600 V, for example. A trigger voltage is applied between the anode electrode EA and the cathode electrode EC of the deuterium lamp 2, so that the deuterium lamp 2 start discharging electricity. Thus, the current I flowing through the detection resistor R1 rises to have a pulse shape, and the detection voltage VD changes to have a negative pulse-shape, Thus, the feedback voltage VF1 output from the inverting amplifier 130 of the feedback circuit 12 rises to a positive value. In this case, because the speed of a feedback operation performed by the feedback circuit 13 is lower than a decrease speed of the voltage of the cathode electrode EC of the deuterium lamp 2, the output voltage VO2 rises to a negative value V3, For example, the output voltage VO2 decreases to about −70 V, for example, and the feedback voltage VF1 increases to about 2 V, for example.

At a point t3 in time, the output voltage VO1 decreases to about 80 V, for example. Further, the anode voltage VA also decreases to about 80 V. The feedback voltage VF2 decreases to about 0.67 V, for example. The capacitor C1 discharges electricity, so that the output voltage VO2 increases gradually, and the feedback voltage VF1 decreases gradually.

At a point t4 in time, the output voltage VO2 is about −3.75 V, for example. The feedback voltage VF1 is 1.25 V, for example. Thus, the feedback voltage VF1, which is the higher voltage between the feedback voltages VF1, VF2, is input to the control terminal TC of the booster circuit 110. The booster circuit 110 performs switching control based on the feedback voltage VF1 such that a DC voltage become close to a discharge maintaining voltage. Here, the discharge maintaining voltage is a voltage that is least required to maintain electric discharge of the deuterium lamp 2. In the present example, the output voltage VO1 is maintained at about 80 V, and the output voltage VO2 is maintained at about −3.75 V.

The constant current control circuit 16 controls the transistor Q such that the constant current I (0.3 A, for example) flows through the detection resistor R1. Thus, after the point t3 in time, the detection voltage VD is maintained at a target voltage (−0.75 V, for example).

(3) Configuration of Detector 106 for Chromatograph

Figure 4:
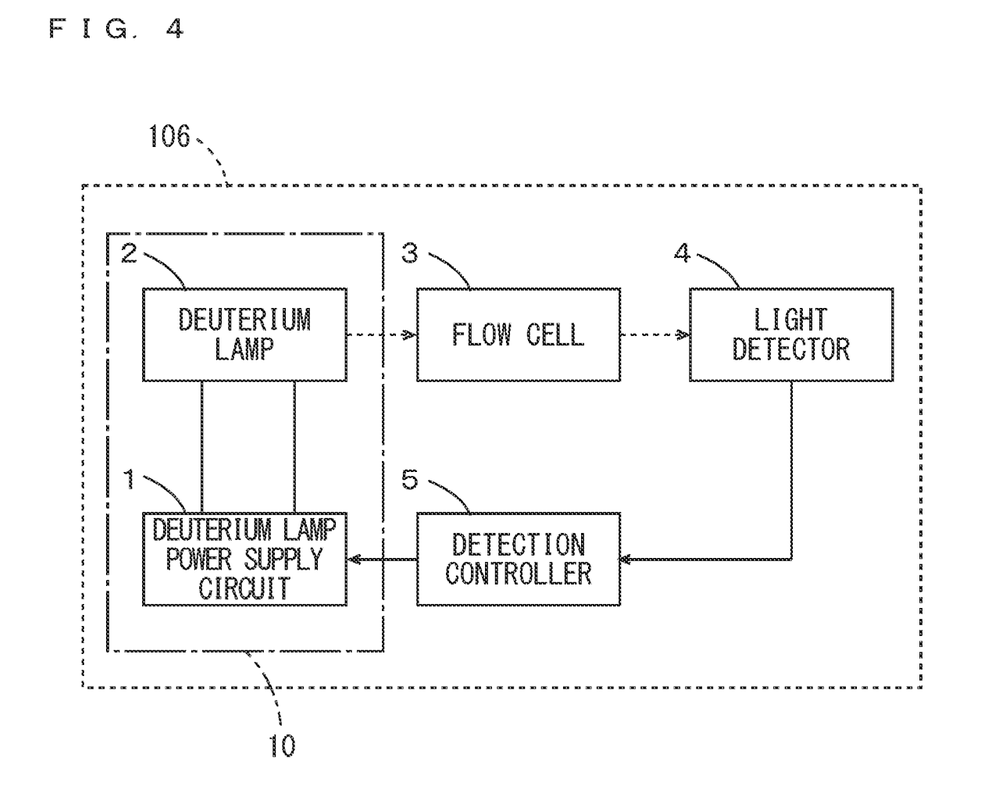
FIG. 4 is a block diagram showing the configuration of the detector for a chromatograph using the liquid source of FIG. 1.

FIG. 4 is a block diagram showing the configuration of the detector 106 for a chromatograph using the light source 10 of FIG. 1.

The detector 106 for a chromatograph includes the deuterium lamp power supply circuit 1, the deuterium lamp 2, a flow cell 3, a light detector 4 and a detector controller 5. As described above, the deuterium lamp power supply circuit 1 and the deuterium lamp 2 constitute the light source 10.

The deuterium lamp power supply circuit 1 turns on the deuterium lamp 2. Thus, light in an ultraviolet region is generated from the deuterium lamp 2. The light generated from the deuterium lamp 2 is guided to the flow cell 3 by an optical system (not shown) including a collector mirror or the like. A mobile phase and a sample supplied from an analysis column of a liquid chromatograph flows into the flow cell 3, for example. The light transmitted through the flow cell 3 is guided to the light detector 4 by the optical system (not shown) including a mirror, a diffraction grating and the like. The light detector 4 includes a photodiode or a photo diode array, for example, and detects a change in intensity of light in each wavelength range over time.

The detector controller 5 is constituted by a CPU (Central Processing Unit), a RAM (Random Access Memory), a ROM (Read Only Memory) and so on. This detector controller 5 controls the deuterium lamp power supply circuit 1 and receives an output signal of the light detector 4.

(4) Liquid Chromatograph

Figure 5:
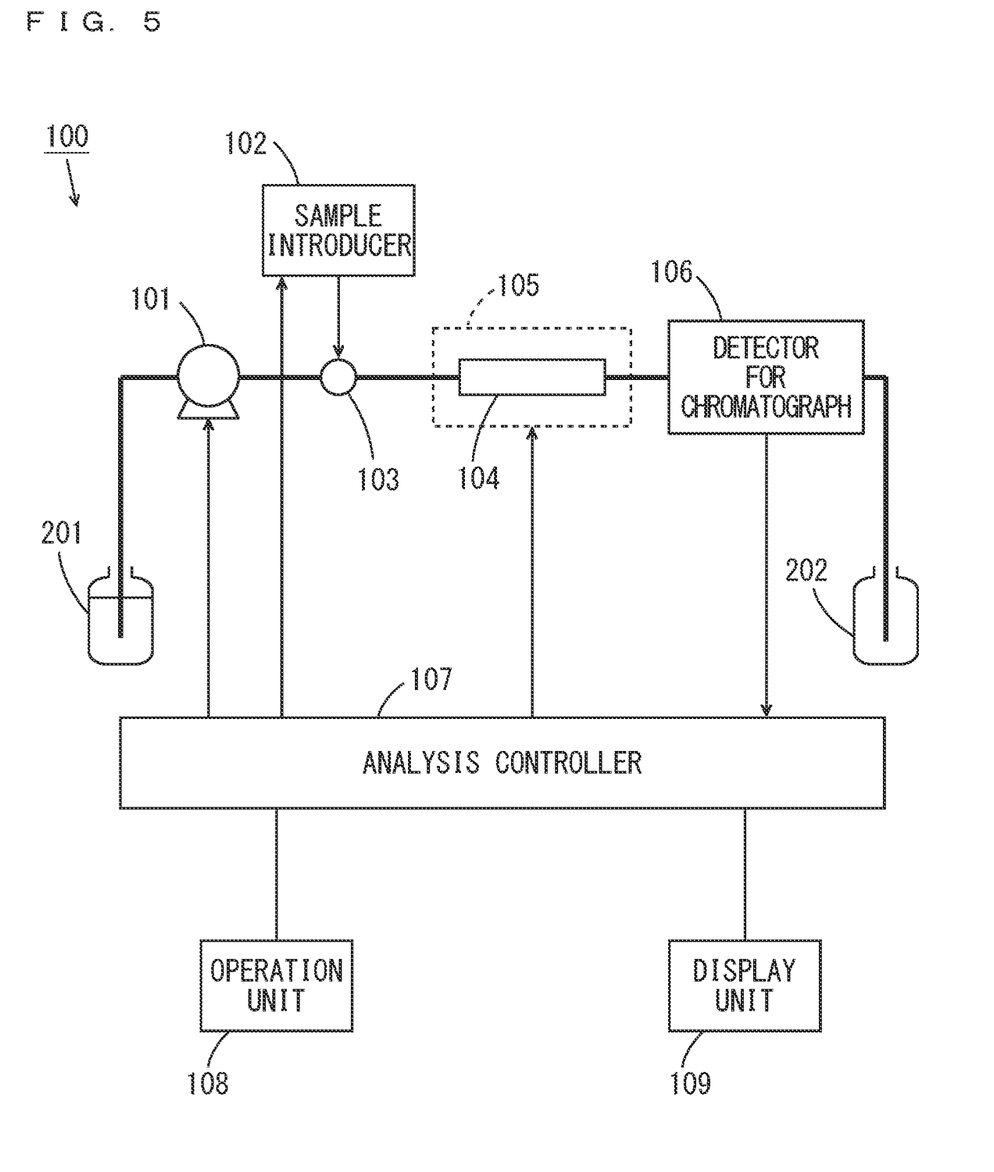
FIG. 5 is a block diagram showing the configuration of a liquid chromatograph including the detector for a chromatograph of FIG. 4.

FIG. 5 is a block diagram showing the configuration of a liquid chromatograph including the detector 106 for a chromatograph of FIG. 4.

A liquid chromatograph 100 of FIG. 5 includes a pump 101 fora mobile phase, a sample introducer 102, an introduction port 103, an analysis column 104, a column oven 105 and the detector 106 for a chromatograph. The analysis column 104 is provided in the column oven 105. The column oven 105 maintains the temperature of the analysis column 104 at a set temperature.

The pump 101 sucks a mobile phase (eluent) in a mobile phase container 201 and supplies the mobile phase to the analysis column 104. The sample introducer 102 includes an autosampler or an injector, for example, and introduces a sample to be analyzed into the mobile phase in the introduction port 103. The mobile phase and the sample that have passed through the analysis column 104 flow through the flow cell 3 (FIG. 4) of the detector 106 for a chromatograph and is discharged to a liquid waste container 202.

The liquid chromatograph 100 includes an analysis controller 107, an operation unit 108 and a display unit 109. The operation unit 108 is used by a user to provide various instructions to the analysis controller 107. The analysis controller 107 controls the pump 101, the sample introducer 102, the column oven 105 and the detector 106 for a chromatograph. Further, the analysis controller 107 generates a chromatogram based on an output signal of the detector controller 5 of the detector 106 for a chromatograph. The generated chromatogram is displayed in the display unit 109.

(5) Effects of Embodiments

With the detector 106 for a chromatograph according to the present embodiment, after electric discharge of the deuterium lamp 2 is started, the feedback voltage VF1 that changes depending on a DC voltage applied to the deuterium lamp 2 is fed back to the control terminal TC of the booster circuit 110. Thus, the booster circuit 110 performs a switching operation such that the DC voltage becomes close to a discharge maintaining voltage. Thus, a power loss caused by the difference between the DC voltage applied to the deuterium lamp 2 and the discharge maintaining voltage is suppressed. Further, a discharge current of the deuterium lamp 2 is controlled to be constant by the constant current control circuit 16. Thus, superimposition of switching noise and ripple caused by a switching operation of the DC voltage generation circuit 11 onto the discharge current is suppressed. Further, because the constant current control circuit 16 is constituted by components having good temperature characteristics, the change of a discharge current caused by a change in ambient temperature can be suppressed at low cost without dependence on the temperature characteristics of the DC voltage generation circuit 11, the current paths 14, 15 and the feedback circuit 12. Further, because a power loss is suppressed, a radiator for the transistor Q is not required. Thus, the transistor Q can be mounted on a surface. Therefore, the light amount of the deuterium lamp 2 can be maintained constant with high accuracy while an increase in cost is suppressed. As a result, an increase in cost can be suppressed, and the detection accuracy can be improved, in the detector 106 for a chromatograph.

Further, a discharge current of the deuterium lamp 2 is detected by the detection resistor R1 included in the current path 15, and a discharge current is controlled to be constant by the control of the transistor Q based on the detected discharge current. Thus, the discharge current can be detected and controlled with a simple circuit configuration.

Further, a DC voltage applied to the deuterium lamp 2 before and after electric discharge of the deuterium lamp 2 is started can be automatically and appropriately changed by a feedback voltage, which is a higher voltage between the feedback voltage VF2 output from the feedback circuit 12 and the feedback voltage VF1 output from the feedback circuit 13.

(6) Other Embodiments

While the current path 15 includes the transistor Q and the detection resistor R1 in the above-mentioned embodiment, the current path 14 may include the transistor Q1 and the detection resistor R1. In this case, the constant current control circuit 16 is connected to the current path 14.

While the detection resistor R1 is connected to the node N4 and the transistor Q is connected to the node N2 in the above-mentioned embodiment, the transistor Q may be connected to the node N4 and the detection resistor R1 may be connected to the node N2.

While the detector 106 for a chromatograph is used in the liquid chromatograph 100 in the above-mentioned embodiment, the detector 106 for a chromatograph may be used in another chromatograph such as a supercritical chromatograph.

(7) Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. In the above-mentioned embodiment, the current paths 14, 15 are examples of a voltage application circuit, the feedback circuit 13 is an example of a first feedback circuit, the feedback circuit 12 is an example of a second feedback circuit, the feedback voltage VF1 is an example of a first feedback voltage, the feedback voltage VF2 is an example of a second feedback voltage, the current path 14 is an example of a first current path, and the current path 15 is an example of a second current path. The node N1 is an example of a first output node, the node N2 is an example of a second output node, the anode electrode EA is an example of a first electrode, and the cathode electrode EC is an example of a second electrode. The transistor Q is an example of a current adjustment device, the diodes D4, D6 are examples of a selection circuit, the feedback voltage VF1 is an example of a first feedback voltage, and the feedback voltage VF2 is an example of a second feedback voltage.

(8) Aspects

It is understood by those skilled in the art that the plurality of above-mentioned illustrative embodiments are specific examples of the below-mentioned aspects.

(Item 1) A detector for a chromatograph, according to one aspect may include a light source, and a light detector that detects light generated based on turning on of the light source, wherein the light source may include a deuterium lamp, and a deuterium lamp power supply circuit connected to the deuterium lamp, and the deuterium lamp power supply circuit may include a DC voltage generation circuit that generates a DC voltage by performing a switching operation, a rectifying operation and a smoothing operation, a voltage application circuit that applies a DC voltage generated by the DC voltage generation circuit to the deuterium lamp, a first feedback circuit that feeds a first feedback voltage changing depending on a DC voltage to the DC voltage generation circuit such that the DC voltage generated by the DC voltage generation circuit becomes close to a discharge maintaining voltage, after electric discharge of the deuterium lamp is started, and a constant current control circuit that controls a discharge current of the deuterium lamp to be constant.

With the detector for a chromatograph according to item 1, the first feedback voltage that changes depending on a current voltage applied to the deuterium lamp is fed back to the DC voltage generation circuit. Thus, the DV voltage generation circuit performs a switching operation such that a DC voltage becomes close to a discharge maintaining voltage. Thus, a power loss caused by the difference between the DC voltage applied to the deuterium lamp and the discharge maintaining voltage is suppressed. Further, a discharge current of the deuterium lamp is controlled to be constant by the constant current control circuit. Thus, superimposition of switching noise and ripple caused by the switching operation of the DC voltage generation circuit onto the discharge current is suppressed. Further, because the constant current control circuit is constituted by components having good temperature characteristics, the change of a discharge current caused by a change in ambient temperature can be suppressed at low cost without dependence on the temperature characteristics of the DC voltage generation circuit, the voltage application circuit and the first feedback circuit. Further, because a power loss is suppressed, a radiator is not required. Therefore, the light amount of the deuterium lamp can be maintained constant with high accuracy while an increase in cost is suppressed. As a result, an increase in cost can be suppressed, and the detection accuracy can be improved, in the detector for a chromatograph.

(Item 2) The detector for a chromatograph, according to item 1, wherein the deuterium lamp may include first and second electrodes, the DC voltage generation circuit may have first and second output nodes that output the DC voltage, the voltage application circuit may include a first current path connected between the first output node and the first electrode of the deuterium lamp and a second current path connected between the second output node and the second electrode of the deuterium lamp, and the constant current control circuit may be connected to the second current path such that a current flowing through the second current path is controlled to be constant by the constant current control circuit.

With the detector for a chromatograph, according to item 2, a DC voltage output between the first and second nodes by the DC voltage generation circuit is applied to the first and second electrodes of the deuterium lamp through the first and second current paths. Further, a current flowing through the second current path is controlled to be constant, so that a discharge current of the deuterium lamp is controlled to be constant with a simple configuration.

(Item 3) The detector for a chromatograph, according to item 2, wherein the second current path may include a detection resistor and a current adjustment device, and the constant current control circuit may control a current flowing through the current adjustment device based on a voltage at one end of the detection resistor.

With the detector for a chromatograph, according to item 3, a discharge current of the deuterium lamp is detected by a detection resistor included in the second current path, and a discharge current is controlled to be constant by the current adjustment device based on the detected discharge current. In this case, a discharge current can be detected and controlled with a simple circuit configuration.

(Item 4) The detector for a chromatograph, according to item 2 or 3, wherein the current adjustment device may include a transistor, and the constant current control circuit may control a voltage of a control electrode of the transistor based on a voltage at one end of the detection resistor.

With the detector for a chromatograph, according to item 4, the component cost for the current adjustment device can be suppressed.

(Item 5) The detector for a chromatograph, according to any one of items 2 to 4, wherein the first feedback circuit may include an inverting amplifier that inversion-amplifies a voltage of the second output node.

With the detector for a chromatograph, according to item 5, a DC voltage applied to the deuterium lamp can be brought close to a discharge maintaining voltage by an inverting amplifier with a simple circuit configuration.

(Item 6) The detector for a chromatograph, according to any one of items 2 to 5, wherein the first current path may include a diode, and the deuterium lamp power supply circuit may further include a trigger voltage generation circuit that applies a trigger voltage for causing the first electrode of the deuterium lamp to discharge electricity.

With the detector for a chromatograph, according to item 6, it is possible to apply a trigger voltage to the first electrode of the deuterium lamp without affecting the DC voltage generation circuit to start electric discharge of the deuterium lamp.

(Item 7) The detector for a chromatograph, according to any one of items 2 to 6, wherein the deuterium lamp power supply circuit may further include a second feedback circuit that feeds back a second feedback voltage changing depending on a voltage of the first output node to the DC voltage generation circuit such that the DC voltage generated by the DC voltage generation circuit maintains a constant voltage higher than the discharge maintaining voltage, before electric discharge of the deuterium lamp is started.

With the detector for a chromatograph, according to item 7, a constant DC voltage is applied to the deuterium lamp by the second feedback circuit with a simple configuration before electric discharge of the deuterium lamp is started.

(Item 8) The detector for a chromatograph, according to item 7, wherein the first feedback circuit may operate such that the first feedback voltage is lower than the second feedback voltage before electric discharge of the deuterium lamp is started and the first feedback voltage is higher than the second feedback voltage alter electric discharge of the deuterium lamp is started, and the deuterium lamp power supply circuit may further include a selection circuit that selectively outputs a higher voltage between the first and second feedback voltages to the DC voltage generation circuit.

With the detector for a chromatograph, according to item 8, a DC voltage applied to the deuterium lamp before and after electric discharge of the deuterium lamp can be changed automatically and appropriately.

The invention claimed is:

1. A detector for a chromatograph, comprising:
   a light source; and
   a light detector that detects light generated based on turning on of the light source, wherein
   the light source includes
   a deuterium lamp, and
   a deuterium lamp power supply circuit connected to the deuterium lamp, and
   the deuterium lamp power supply circuit includes
   a DC voltage generation circuit that generates a DC voltage by performing a switching operation, a rectifying operation and a smoothing operation,
   a voltage application circuit that applies the DC voltage generated by the DC voltage generation circuit to the deuterium lamp,
   a first feedback circuit that feeds a first feedback voltage from the light source, changing depending on the DC voltage, to the DC voltage generation circuit such that the DC voltage generated by the DC voltage generation circuit becomes close to a discharge maintaining voltage, after electric discharge of the deuterium lamp is started, and
   a constant current control circuit that controls a discharge current of the deuterium lamp to be constant.

2. The detector for the chromatograph, according to claim 1, wherein
   the deuterium lamp includes first and second electrodes,
   the DC voltage generation circuit has first and second output nodes that output the DC voltage,
   the voltage application circuit includes a first current path connected between the first output node and the first electrode of the deuterium lamp and a second current path connected between the second output node and the second electrode of the deuterium lamp, and
   the constant current control circuit is connected to the second current path such that a current flowing through the second current path is controlled to be constant by the constant current control circuit.

3. The detector for the chromatograph, according to claim 2, wherein
the second current path includes a detection resistor and a current adjustment device, and
the constant current control circuit controls a current flowing through the current adjustment device based on a voltage at one end of the detection resistor.

4. The detector for the chromatograph, according to claim 3, wherein
the current adjustment device includes a transistor, and
the constant current control circuit controls a voltage of a control electrode of the transistor based on a voltage at one end of the detection resistor.

5. The detector for the chromatograph, according to claim 2, wherein
the first feedback circuit includes an inverting amplifier that inversion-amplifies a voltage of the second output node.

6. The detector for the chromatograph, according to claim 2, wherein
the first current path includes a diode, and
the deuterium lamp power supply circuit further includes a trigger voltage generation circuit that applies a trigger voltage for causing the first electrode of the deuterium lamp to discharge electricity.

7. The detector for the chromatograph, according to claim 2, wherein
the deuterium lamp power supply circuit further includes a second feedback circuit that feeds back a second feedback voltage changing depending on a voltage of the first output node to the DC voltage generation circuit such that the DC voltage generated by the DC voltage generation circuit maintains a constant voltage higher than the discharge maintaining voltage, before electric discharge of the deuterium lamp is started.

8. The detector for the chromatograph, according to claim 7, wherein
the first feedback circuit operates such that the first feedback voltage is lower than the second feedback voltage before electric discharge of the deuterium lamp is started and the first feedback voltage is higher than the second feedback voltage after electric discharge of the deuterium lamp is started, and
the deuterium lamp power supply circuit further includes a selection circuit that selectively outputs a higher voltage between the first and second feedback voltages to the DC voltage generation circuit.

9. The detector for the chromatograph, according to claim 1, wherein
the deuterium lamp includes first and second electrodes, and the second electrode is connected to the first feedback circuit.

* * * * *